May 7, 1946.  R. LAMBORN  2,399,931
DYNAMOELECTRIC MACHINE
Filed May 5, 1944
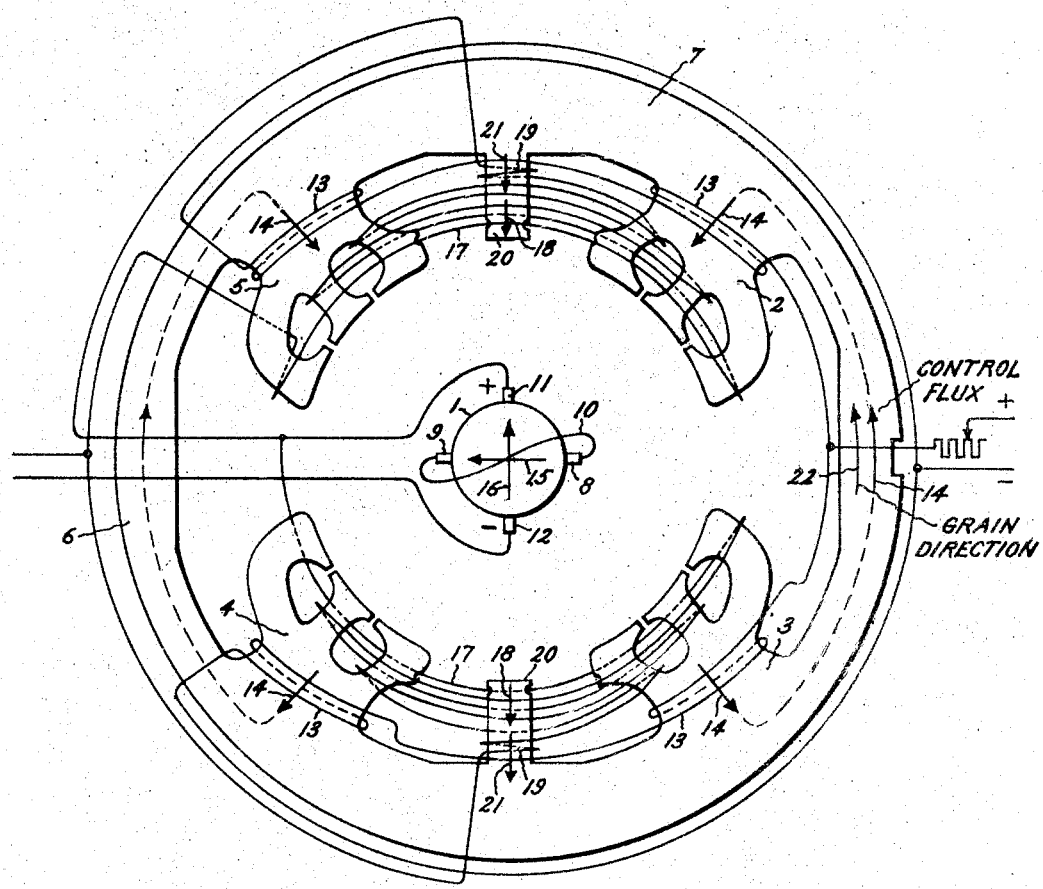
Inventor:
Richard Lamborn,
by *Harry E. Dunham*
His Attorney.

Patented May 7, 1946

2,399,931

UNITED STATES PATENT OFFICE 2,399,931

DYNAMOELECTRIC MACHINE

Richard Lamborn, Erie, Pa., assignor to General Electric Company, a corporation of New York Application May 5, 1944, Serial No. 534,203

9 Claims. (Cl. 171—312)

My invention relates to dynamoelectric machines and in particular to machines having an improved arrangement of the magnetic material core.

In electrical devices such as dynamoelectric machines in which a relatively small control signal is utilized to provide an amplified output voltage responsive to the input control signal, two main factors which determine the usefulness of the equipment are the speed of response and accuracy of response. The effect of hysteresis in some cases may be neglected if the speed of response or the losses in the machine are considered to be of greater importance. However, for many applications, the accuracy of response is the most important feature to be considered in the design of the machine, and if the magnetic circuit as determined by the magnetic material forming this circuit has a particularly wide hysteresis loop, the machine may not respond consistently to a predetermined control signal, as its accuracy of response will be affected by the previous magnetic excitation of the circuit. In order to improve the accuracy of response of such a machine, it is desirable that the hysteresis loop should be as narrow as possible. Special windings excited by peaked-wave alternating currents have been used to minimize this hysteresis effect. In my improved arrangement, the grain structure and crystalline arrangement of the magnetic material is utilized to obtain a hysteresis loop having a minimum width. The effect of the grain structure on the characteristics of magnetic material has been discussed in detail in U. S. Patent 2,053,162, R. M. Pfalzgraf, assigned to the assignee of this application, and this relation of the grain structure to the magnetic circuit may be called the magnetic orientation of the material.

An object of my invention is to provide improved cores for electrical devices having improved accuracy of response to control signals.

Another object of my invention is to provide an improved dynamoelectric machine having an excitation system including a core of magnetic material arranged to provide improved electromagnetic response properties to the machine.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing is a schematic diagram of an armature reaction excited dynamoelectric machine provided with an embodiment of my improved excitation system and magnetic core.

Referring to the drawing, I have shown an armature reaction excited dynamoelectric machine arranged as a generator provided with a rotatable member or armature 1 having a commutator connected to an armature winding of the conventional direct current type and adapted to be driven at suitable speeds by any suitable source of mechanical power. For illustrative purposes, the machine is shown as having a two-pole excitation system which comprises four stationary member pole pieces 2, 3, 4, and 5 connected together by yoke sections 6 and 7. With this type excitation, each pole comprises two polar segments, and the armature is provided with a set of primary brushes 8 and 9 which are connected together by a short-circuiting connection 10 and a set of secondary brushes 11 and 12 which are circumferentially spaced about the commutator away from the primary brushes 8 and 9 by substantially 90 electrical degrees. In order to control the operation of the machine, a field exciting winding 13 is arranged on the polar projections to provide a component of control excitation magnetic flux as indicated by the arrows 14. When the armature 1 is rotated, the armature winding cuts the control excitation flux 14, and a voltage is generated between the primary brushes 8 and 9 such that a very small amount of control flux tends to build up a relatively large primary current through that part of the armature which is connected between these short-circuited brushes. This primary current produces a component of armature reaction magnetic excitation along the primary commutating axis, as indicated by the arrow 15. The armature winding also cuts this magnetic excitation flux 15 such that a voltage is induced in this winding between the secondary or load brushes 11 and 12, and if these brushes are connected to a load, a secondary or load current will flow through a secondary circuit formed in the armature winding between these brushes. This will produce a secondary or load component of armature reaction along the commutating axis of these brushes which is in electrical quadrature with the primary or main load component of excitation 15, as indicated by the arrow 16 in the drawing. As shown in the drawing, this load component of armature reaction 16 is in opposition to the control component of excitation 14 and thereby tends to minimize the effectiveness of the control field. The sensitivity of response of the machine is increased by providing a compensating field exciting winding 17 arranged to excite the stationary pole pieces and provide a component of excitation, indicated by the arrow 18, in opposition to the load component of armature reaction 16, thereby effectively eliminating or minimizing the effect of this component of armature reaction. In order to improve the effectiveness of this compensating field exciting winding 17, turns are arranged in pole face winding slots in the pole pieces. This compensating field exciting winding 17 is connected in series with the load or secondary brush 11 such that the component of excitation provided by this field exciting winding is directly proportional to the same load current which produces the load component of armature reaction 16 and thereby varies directly in accordance with variations in the load component of armature reaction. A commutating field exciting winding 19 is arranged on commutating pole pieces 20 and is connected in series with the compensating field exciting winding 17 such that it produces a commutating component of excitation, as indicated by the arrow 21, proportional to the load current of the machine along the load commutating axis of the machine. The control signals energize the control field exciting winding 13 to produce the control component of excitation 14, which in turn induces a voltage in the armature winding which produces the short-circuit current and thereby produces the quadrature component of excitation 15, and this in turn induces the load voltage in the armature between the load brushes 11 and 12, thereby producing a two-step amplification of the input control signal of the control field exciting winding 13. Thus, variations which affect the accuracy of response of the load voltage to the input control signal are amplified through this two-step electromagnetic amplification of the excitation system.

In my improved construction, the core of the stationary member is formed of laminated ferromagnetic material having a granular formation and crystalline arrangement such that the greater or maximum magnetic orientation in the yoke is substantially in the direction of the control flux component of excitation, as indicated by the arrow 22. From actual tests, I have found that a machine having this type orientation of the ferromagnetic material produces dependable and consistent hysteresis characteristics and also that the hysteresis loop of such a machine is markedly narrower than a machine in which the grain direction in the yoke is in the direction of the cross or quadrature flux.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A core of ferro-magnetic material for a dynamoelectric machine of the armature reaction excited type having an armature, said core being adapted to provide magnetic field poles for the machine and comprising material having maximum magnetic orientation substantially in the direction of the control excitation component of magnetic flux and minimum magnetic orientation substantially in the direction of armature reaction flux in quadrature with the control excitation component of magnetic flux.

2. A car of laminated magnetic material for a dynamoelectric machine of the armature reaction excited type, said core including pole pieces providing magnetic field poles for the machine and formed of material having greater magnetic orientation substantially in the direction of the control excitation component of magnetic flux and lesser magnetic orientation substantially in the direction of armature reaction flux in quadrature with the control excitation component of magnetic flux of said pole pieces.

3. A dynamoelectric machine of the armature reaction excited type having a stationary member core of magnetic material and an armature, said core being adapted to provide magnetic field poles for the machine and comprising material having greater magnetic orientation substantially in the direction of the control excitation component of magnetic flux and lesser magnetic orientation substantially in the direction of the component of armature reaction flux in quadrature with the control excitation component of magnetic flux.

4. A dynamoelectric machine of the armature reaction excited type having a stationary member core of laminated magnetic material and an armature, said core being adapted to provide magnetic field poles for the machine and comprising material having maximum magnetic orientation substantially in the direction of the control excitation component of flux and minimum magnetic orientation substantially in the direction of the component of armature reaction flux in quadrature with the control component of excitation.

5. An excitation system for a dynamoelectric machine of the armature reaction excited type having an armature and including a core of magnetic material and arranged to provide magnetic field poles for the machine, and a field exciting winding on said core, said core material being arranged with greater magnetic orientation substantially in the direction of the control excitation component of magnetic flux and lesser magnetic orientation substantially in the direction of armature reaction flux in quadrature with the control excitation component of magnetic flux.

6. An excitation system for a dynamoelectric machine of the armature reaction excited type having an armature and including a stationary core member of magnetic material provided with laminated field pole pieces and a control field exciting winding on said pole pieces, said core material being arranged with maximum magnetic orientation substantially in the direction of the control excitation component of magnetic flux and minimum magnetic orientation substantially in the direction of armature reaction flux in quadrature with the control excitation component of magnetic flux in said pole pieces.

7. An excitation system for a dynamoelectric machine of the armature reaction excited type having an armature and including a stationary core member of magnetic material provided with salient field pole pieces, and a field exciting winding on said pole pieces, said pole piece material being arranged with greater magnetic orientation substantially in the direction of the control excitation component of magnetic flux provided by said field exciting winding and lesser magnetic orientation substantially in the direction of the armature reaction in quadrature with the control component of excitation.

8. An excitation system for an armature reaction excited dynamoelectric machine having an armature and including a stationary core member of magnetic material adapted to provide magnetic field poles for the machine, and a control field exciting winding on said core, said core material being arranged with greater magnetic orientation substantially in the direction of the control excitation component of magnetic flux and lesser magnetic orientation substantially in the direction of armature reaction in quadrature with the control excitation component of magnetic flux.

9. An excitation system for a dynamoelectric machine of the armature reaction excited type having an armature including a stationary core member of magnetic material adapted to provide magnetic field poles for the machine, a control field exciting winding on said core, said core material being arranged with greater magnetic orientation substantially in the direction of the control excitation component of magnetic flux and lesser magnetic orientation substantially in the direction of armature reaction in quadrature with the control excitation component of magnetic flux, and a compensating field exciting winding arranged substantially to neutralize the component of armature reaction opposed to the control component of excitation.

RICHARD LAMBORN.